Nov. 21, 1967     G. SWIFT     3,353,404
APPARATUS FOR TESTING ROAD SURFACES AND METHOD
Filed Jan. 29, 1965     3 Sheets-Sheet 1

*INVENTOR.*
GILBERT SWIFT

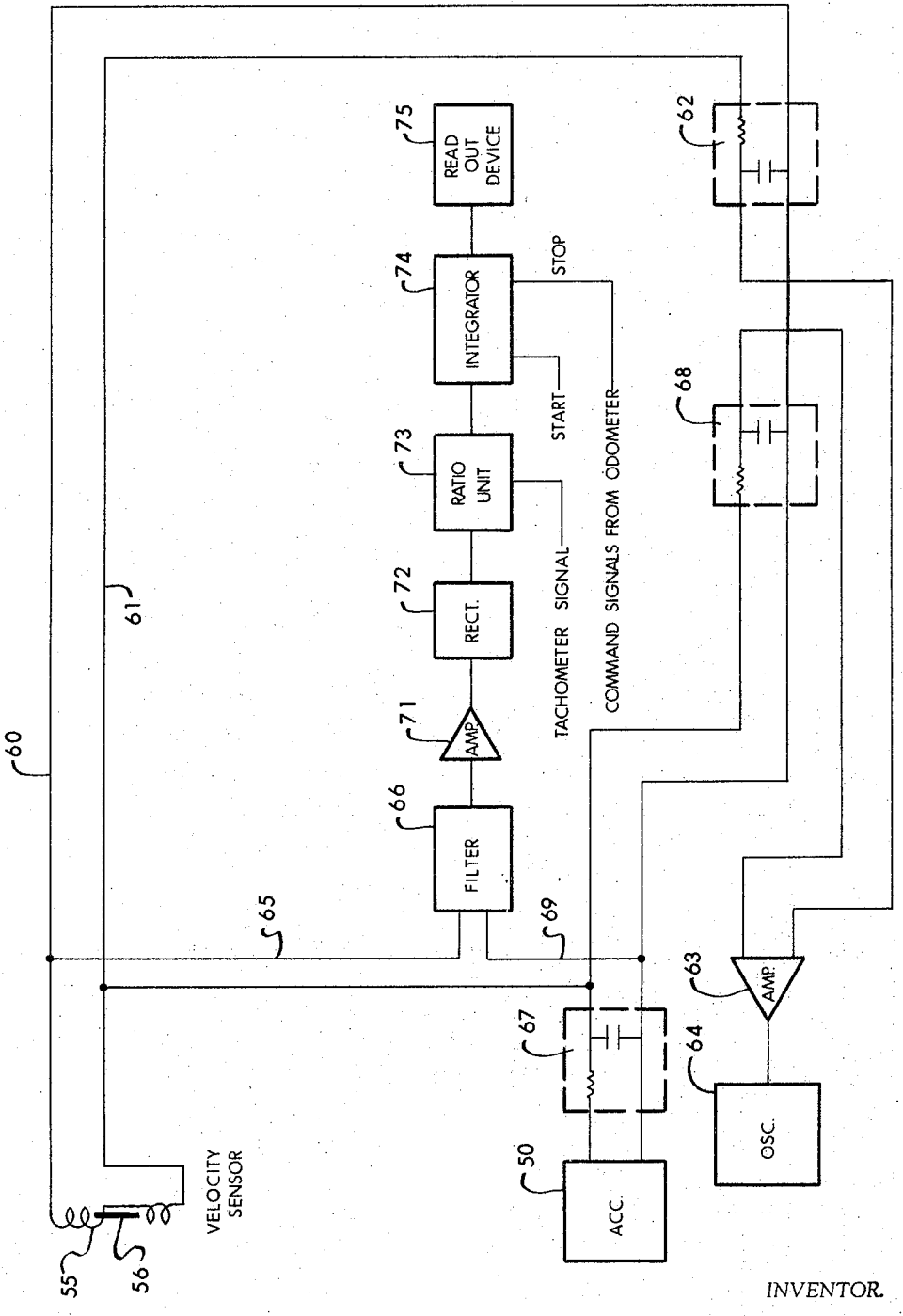

United States Patent Office 3,353,404
Patented Nov. 21, 1967

3,353,404
APPARATUS FOR TESTING ROAD
SURFACES AND METHOD
Gilbert Swift, Houston, Tex., assignor to Dresser Industries, Inc., Dallas, Tex., a corporation of Delaware
Filed Jan. 29, 1965, Ser. No. 428,956
16 Claims. (Cl. 73—146)

ABSTRACT OF THE DISCLOSURE

A contact wheel is moved over a surface, the vertical movement due to roughness being electrically sensed, then rectified, and then integrated to form an indicia of the roughness. The horizontal movement of the wheel is also electrically sensed and a ratio taken of the horizontal and vertical movement signals.

---

This invention relates to an apparatus and method for testing road surfaces. More particularly, this invention relates to an apparatus and method for measuring the roughness of road surfaces and providing an indicia which is representative of road roughness. In some embodiments of the invention, a record of road profile is also provided.

For purposes of road maintenance, repair and servicing, as well as in evaluating newly completed stretches of road surfaces, it is desirable to have a method and apparatus for testing the road surface and to provide an indicia which is representative of road surface or roughness. It is also desirable to have an apparatus which will provide an indicia which may be compared with other road surfaces on a meaningful basis since no two road profiles are exactly alike. Thus, by having an apparatus and method which produces an indicia which is representative of road roughness, comparisons can be made between roads in one area and roads in another area to determine the relative degree of maintenance required. In the case of new highways, for example, it is desirable to have an apparatus and method which will provide an indicia of road roughness to determine whether or not certain specifications have been met. Moreover, it is often times desirable to determine the variation in road roughness of a particular road surface from season to season, which variations can be compared with variations in other areas and other seasons.

The prior art contains numerous examples of attempts to provide an apparatus and method to accomplish the foregoing results, all of which have certain shortcomings which will be discussed hereinafter.

For example, certain roughometers and other similar devices have been built which measure the sum of all the upward or downward deflections of a contact point, ordinarily a wheel, with respect to a spring supported frame or vehicle. The deflections are totalized while traversing a given distance such as one mile. The summation thus represents a ratio of two distances, the vertical to the horizontal, and is usually expressed in inches per mile. These types of instruments suffer from many defects, including the fact that their frame reference is not devoid of vertical motion. As a consequence, the measured deflections do not truly represent the road roughness. They do represent the road only to the extent that this suspension system attenuates the effect of the road on the frame. Further, since relatively long wave length disturbances cannot be appreciably attenuated by a conventional suspension system, only the shorter wave lengths disturbances are actually detected. Another shortcoming of these instruments is that the extremely short wave length roughnesses, due to textural characteristics of the surface, are often included. As a consequence, the roughometer readings fail to compare with the actual defects as observed by a rider in a vehicle traversing the same road.

The pior art has various types of profilometers which measure the slope of a very short wheel base trailer with respect to the attitude of a long towbar. The sum of the slopes, measured without respect to sign at a large number of equally spaced locations within a given distance, such as one mile, is totalized to provide the reading. This summation of slopes corresponds to a ratio of two distances and can therefore be expressed in inches per mile. This type of apparatus also suffers certain shortcomings. For example, they are unable to measure the long wave length disturbances since their towbars are necessarily limited in length. Some of the profilometers are also excessively sensitive to textural roughness.

In neither of the aforesaid types of apparatuses is it practical to increase the response to long irregularities, nor convenient to diminish the response to extremely short disturbances.

It is desirable to have an apparatus and method which can respond to both long and short wave length components and in which appropriate filtering can be provided to suppress unwanted textural detail and in which the difficulties inherent in providing a reference frame are avoided.

In addition, certain of the prior art devices must be run at extremely slow speeds, such as two to five miles per hour, which greatly limits their use on roads where heavy traffic is involved. In addition, certain of the apparatuses are also limited to a specified speed and cannot vary appreciably from that speed, which again limits their use in certain traffic congested areas.

Accordingly, it is an object of this invention to provide an improved method and apparatus for testing road surfaces and measuring road roughness which method and apparatus overcomes the shortcomings of the prior art noted above.

Briefly stated, the invention provides a method of measuring road roughness which includes the steps of passing over the road surface with a member having means for continuously contacting the road surface and forming a moving contact point therewith. The vertical movement of the contact point is then sensed during the horizontal movement therealong and a first electrical signal is produced which signal is representative of the vertical movement of the contact point. The first electrical signal is then rectified to produce a substantially unidirectional second electrical signal proportional to the first signal. The second signal is then integrated over a predetermined interval to obtain an indicia which is representative of road roughness. In some instances, a unidirectional signal may be produced which is representative of average vertical movement of the contact point without the rectifying step.

In some instances, it will be desirable to produce an electrical signal representative of the horizontal movement along the road surface and to form a signal representing the ratio between the signal representative of horizontal movement and the signal representative of vertical movement and thereafter integrating the ratio signal.

It is to be understood that the contact point referred to above can be either established mechanically, as by a contact wheel biased into substantially continuous contact with the road surface, or by sonic means or the like mounted in a vehicle and adapted to maintain continuous contact with the road surface.

Briefly stated, the apparatus of the present invention which may be used for measuring road roughness comprises a member adapted for passing along the road surface and having means for continuously contacting the road surface at a movable contact point during horizontal movement therealong. It is to be understood that this contact means may be a member such as a wheel biased into contact as explained above, or sonic means or the like mounted in a vehicle, whereby moving contact is maintained with the road surface. Means are also provided in the apparatus for sensing the vertical movement of the contact point during horizontal movement along the road and for producing a first electrical signal representative of the vertical movement of the contact point. In case the first electrical signal is not already unidirectional, then means may also be provided for rectifying the first electrical signal to produce a substantially unidirectional second electrical signal proportional to the first signal. In addition, means are provided for integrating the second signal over a predetermined interval, as an indication of road roughness. It is to be understood that the predetermined interval could be either a time interval or a distance interval, depending upon the particular arrangement used.

It is to be further understood that the term "movement" is to be construed broadly and include the many recognized aspects of motion, such as displacement, acceleration, velocity, jerk, and the like. This term is used broadly because it is generally known that the value for one aspect of motion may be transposed to another by appropriate mathematical operations and that signals analogous to or representative of one aspect may be transposed to another aspect by appropriate electrical networks, as is well understood by those skilled in the art.

In certain instances, it may be desirable to have means for sensing the horizontal movement and producing an electrical signal representative thereof and in addition, having means for forming a ratio between the signal representative of horizontal movement and the signal representative of vertical movement. In this instance, the signal representing the ratio between the vertical movement signal and the horizontal movement signal is integrated over a predetermined time interval to obtain an indicia of road roughness.

Sometimes it is desirable to use a vehicle which is softly suspended on an appropriate suspension system, and providing the vehicle with means for contacting the road surface, which means can be either a wheel or sonic means or the like, as described above. In this instance, the vertical movement of the vehicle is sensed and an electrical signal is produced which is representative of the vertical movement of the vehicle. At the same time, the relative movement of the contact point with respect to the vehicle is sensed to produce another electrical signal representative of this relative movement. These two signals then can be added, with proper regard for polarity, by conventional techniques, to provide the desired signal voltage, which is representative of the vertical movement of the contact point.

In certain other embodiments of the invention, it may be desirable to obtain a profile of the road surface at the same time as measuring for road roughness. This can be accomplished by deriving an electrical signal proportional to the vertical movement of the contact point and applying this signal to a record medium to produce a road profile. If the record medium is driven in proportion to horizontal movement there would occur a profile which corresponds to the profile of the road. It is to be understood, of course, that the driving of the record medium in proportion to horizontal distance traveled refers to relative movement of the stylus with respect to the recording medium. Hence, it is possible to move either the recording medium or the recording stylus.

Reference to the drawings will further explain the invention wherein.

Figure 4:
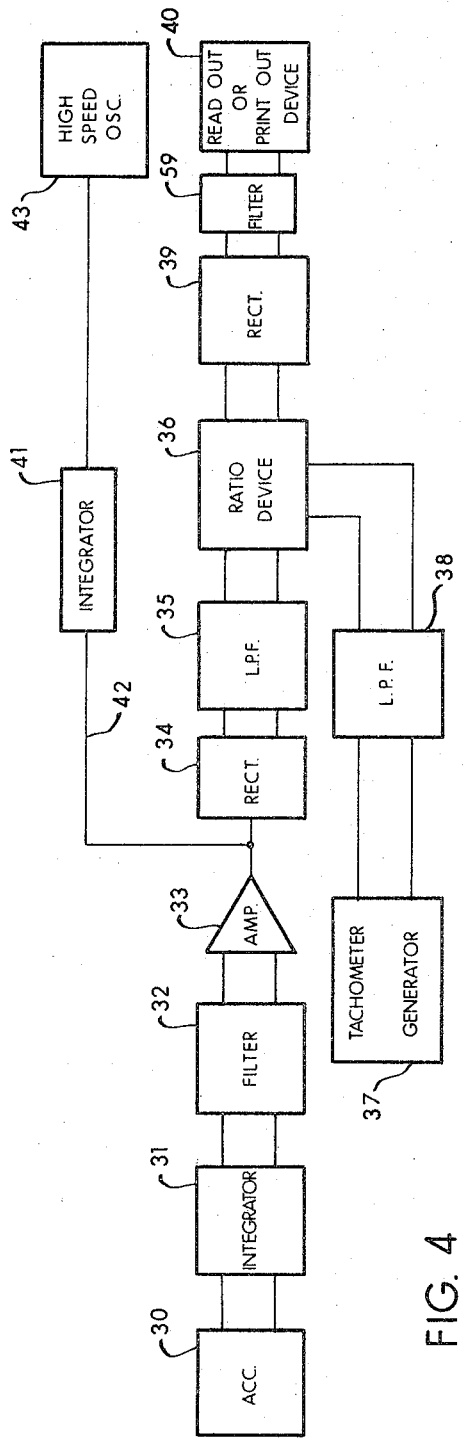
Figure 5:
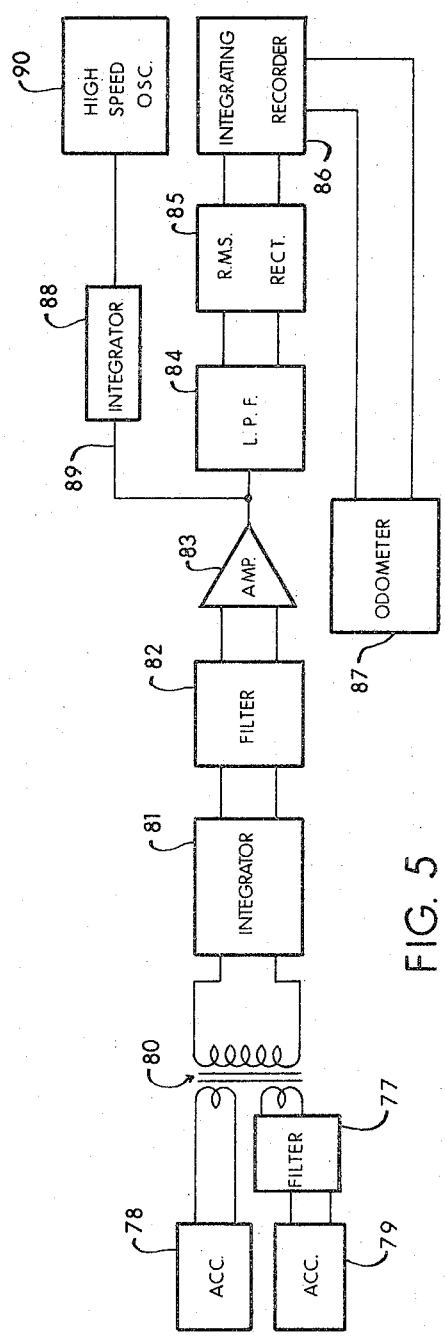

FIG. 4, FIG. 5, and FIG. 6 are each block diagrams of different embodiments of the electrical circuitry of different forms of the invention.

Figure 1:
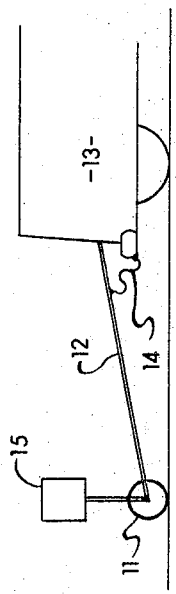
FIG. 1 is a side elevation view of a diagrammatic illustration of a portion of the apparatus of the present invention.

Referring now to FIG. 1, one form of the invention will be discussed in detail. It is desirable to have a contact point with the road surface while horizontally moving therealong, which contact point will follow the surface irregularities and maintain substantially continuous contact therewith. Sensing the vertical movement of this contact point relative to its forward or horizontal speed gives a representation which is representative of roughness. Such a contact point can take the form of a small pneumatic contact wheel 11, mounted on an appropriate contact arm 12 which is pivotably attached to a vehicle such as truck 13, with the contact arm 12 being continuously biased downwardly by appropriate biasing means such as electromagnetic means or tension spring 14.

Contact wheel 11 has mounted thereon an appropriate means for sensing the vertical movement of the contact wheel which means may take the form of accelerometer 15.

It is to be understood that the size and softness of contact wheel 11 can be chosen to minimize the effect of textural roughness which it is desired to eliminate in determining the roughness of the road.

It is to be further understood that the vertical movement of the contact point can be sensed in several ways. The use of an accelerometer is convenient since its output may be integrated to obtain a voltage representative of or proportional to velocity. Suitable commercial accelerometers are available for this purpose. Their characteristics are such that they can respond correctly to the largest as well as the smallest accelerations encountered by the contact wheel. Well-known techniques such as use of an "operational amplifier" can be employed to integrate the accelerometer output signal, to form a voltage representative of the velocity and to provide an effective period as long as several seconds or even several minutes. One such accelerometer is sold by Kistler Instrument Corporation of 8989 Sheridan Drive, Clarence, N.Y., which is identified as its model 303A in Catalogue A from that corporation. Hence, it may be stated that vertical movement of contact wheel 11 is measured with respect to an inertial reference point, which in this instance is the gravitational center of the earth.

Appropriate filtering can be provided at the output of the motion sensing portion of the system to suppress ultra short wave length disturbances, or emphasize certain other wave lengths, as desired. In addition, while long hills may be sensed by accelerometer 15, their effects may be disregarded by appropriate arrangement of the sensing circuit as hereinafter explained.

Figure 3:
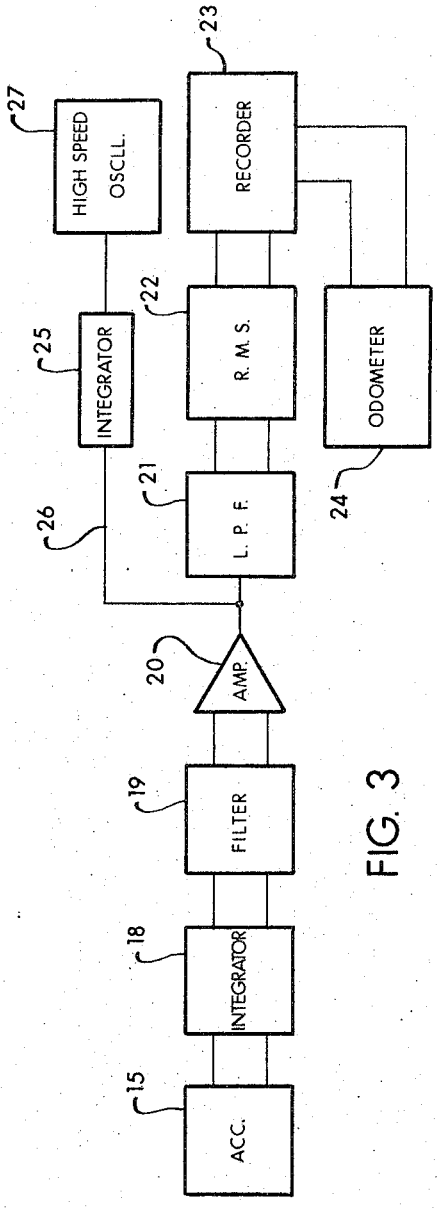
FIG. 3 is a block diagram of one form of the electrical circuit of the present invention.

Referring now to FIG. 3, one electrical circuitry which can be employed with the apparatus shown in FIG. 1, is shown.

There it will be observed that accelerometer 15 is connected by appropriate leads to integrator 18 which is then connected to an appropriate filter 19 which is then connected to amplifier 20. The output of amplifier 20 is directed to an appropriate low pass filter 21 which is connected with an appropriate root mean square (RMS) device 22. This RMS device acts as a rectifier and is connected to a recorder such as integrating recorder 23. Integrating recorders of this type are generally available on the market, with one such recorder being sold by Texas Instruments Inc., P.O. Box 66027, Houston, Tex., as shown in its Servo Bulletin No. R–511. Since it is necessary to integrate over an appropriate interval, either of time or distance, one method of obtaining a proper interval is to sense the forward movement of the vehicle as by means of a contact-making odometer driven from one of the wheels of the vehicle or from the contact wheel itself, such as is shown illustratively as odometer distance sensor 24 shown in FIG. 3 and connected by appropriate leads to recorder 23. Hence, at desired intervals, such as at the end of each mile, a signal can be transmitted from odometer distance sensor 24 to the recorder, which thereby actuates the recorder to provide a read-out indicia which is representative of road roughness. If desired, by using appropriate equipment, the interval could be for a specified time period.

In operation, accelerometer 15 senses the vertical accelerations of contact wheel 11 and produces an output representative thereof, which output is integrated by integrator 18 to produce a signal which is representative of vertical velocity. The output of integrator 18 is then applied to RMS device 22 through appropriate filtering and amplifying means to produce a substantially unidirectional electrical signal proportional to the mean vertical velocity in this instance. The output of the RMS device 22 is then applied to recorder 23 as explained above to provide an indicia or indication of road roughness.

In some instances, it is desirable to also produce a record of road profile at the same time that road roughness is measured. This can easily be accomplished as for example by attaching an integrating circuit such as integrator 25 to the output of amplifier 20 by an appropriate lead such as lead 26. The output of integrator 25 is then applied to high speed oscillograph 27 which records the road profile. Since the output of amplifier 20 represents vertical velocity of contact wheel 11, the integration performed by integrator 25 produces a signal which is representative of vertical displacement which is thus recorded by oscillograph 27.

It is to be understood that other components of movement rather than acceleration can be sensed, and then by utilizing well-known techniques, deriving the signal representative of velocity or displacement or the like.

Referring now to FIG. 4, another embodiment of the present invention will be discussed which utilizes a ratio device to form a signal which is representative of the ratio between the vertical movement of the contact point and the horizontal movement along the road. In this embodiment, accelerometer 30 corresponds with accelerometer 15 in FIGS. 1 and 3, is connected by appropriate leads to integrator 31 which in turn is connected to filter 32, which is connected to amplifier 33, which in turn is connected to rectifier 34 and then to low pass filter 35, which in turn is connected to ratio device 36. This embodiment of the invention contemplates sensing the forward velocity of the vehicle and producing a voltage representative of the forward velocity or its reciprocal. This can be done by a conventional electrical tachometer such as tachometer generator 37 driven from one of the wheels of the vehicle or from the contact wheel itself. Generator 37 is connected to low pass filter 38, which in turn is connected to ratio device 36.

Since the forward speed of the vehicle is not expected to fluctuate widely or rapidly, the ratio of the velocities in this case need not be formed instantaneously. Hence, it is convenient to take the signal produced by accelerometer 30 and integrate the output thereof followed by filtering, amplifying and rectifying prior to forming the ratio between the vertical velocity signal and the horizontal velocity signal. The output signal from accelerometer 30 to ratio device 36 is regarded as a time average of the vertical velocities encountered in the recent past. This signal need only be permitted to vary at least as rapidly as the forward speed of the vehicle may be expected to change. Accordingly, a filter with a time constant up to several seconds in length may be employed.

Thus, it may be stated that any given sustained repetitive vertical motion of the contact wheel 11 will produce a sustained unidirectional voltage to ratio device 36 and that the magnitude of this voltage will be representative of the average velocity of this vertical motion, irrespective of its frequency within the limits set by the velocity sensing system and by the filters.

Filter 35 is selected to provide a voltage representative of the average forward speed during the corresponding interval of time. Hence, the variation with time of both the vertical velocity signal and the horizontal velocity signal will become comparable and thus take care of the situation in which the forward speed may be undergoing fluctuation.

In this instance, a measure of roughness is obtained by forming a ratio between the signal originally generated by accelerometer 30 and the signal produced by tachometer 37. Alternatively, if the reciprocal of forward velocity is utilized, a conventional product or multiplying device could be used. However, the ratio device 36 is a common type circuit which produces an output proportional to the ratio of the two input signals. The output of ratio device 36 is a unidirectional voltage proportional to the ratio of the average vertical velocity to the average horizontal velocity during the recent past, with the exact interval of time being determined by the response characteristics of the filters employed. This will normally be in the vicinity of a few seconds. Accordingly, the output of the ratio device 36 represents the average roughness during the past few seconds. The rectified integral of this quantity over a given distance of traverse will provide the information sought, which is a measure of the roughness of the road within the given distance.

This is accomplished by rectifier 39 which in turn is connected to filter 59 which is then connected to an appropriate read-out or print-out device 40. The integration of the output of rectifier 39 may be performed conveniently in any one of several ways. Print-out device 40 may be of the type such as Solion S–I–100 or Solion R–I–220 which provide meter or digital read-outs of volt-seconds and is produced by Self-Organizing Systems, Inc. of Dallas, Tex. as shown in their brochure No. FL 2–4814. Such an integrator will read the accumulation of the applied signal voltage from a chosen time of beginning up to a chosen time of stopping. If the integration is started at a chosen point along the traverse and stopped at the end of one mile, the accumulated roughness of that mile will be registered. Provision can be made to automatically start, stop, record, and re-start the integrating procedure at selected points along the traverse such as at one mile intervals if desired. A numerical print out once per mile can also be obtained.

Another way of integrating or recording the roughness would make use of a digitizer, periodically sampling the short-time roughness signal (at intervals shorter this time) and employing an adding register to totalize the readings. The output of the adding register would be printed out once per mile and the register re-set to zero each time. This would also permit a numerical print out of each mile traversed.

Again, it may be desirable to produce a record of road profile of the road traversed and this can be accomplished as in the example shown in FIG. 3 by attaching integrator 41 to the output of amplifier 33 by lead 42. Then the output of integrator 41 is a signal representative of vertical displacement, which signal can then be applied to high speed oscillograph 43. Hence, a record is made of the road profile simultaneously with the measuring of road roughness as in the apparatus shown in FIG. 3.

There are alternate ways by which the vertical movement of the contact point can be sensed, which have advantages in certain circumstances such as on very rough roads or at very high speeds, where the acceleration of the contact wheel may be too great for direct application of certain types of accelerometers. One such alternative is accomplished by attaching an accelerometer to the softly suspended vehicle, where it will undergo much less violent accelerations, and integrating its output to obtain the vertical velocity of the vehicle. Then, between the vehicle and the contact wheel, a vertical displacement sensor may be placed such as a potentiometer or a linear voltage differential transformer or a relative velocity sensing device, such as a magnet and coil arrangement. If the displacement sensor is used to sense the relative vertical movement of the contact point with respect to the vehicle, then the output of the displacement sensor may be differentiated by conventional means, such as a resistor, capacitor network, or a suitable transformer, to produce a voltage representative of the vertical velocity of the contact point with respect to the vehicle. Thus, there are then produced two voltages, one representing the vertical velocity of the vehicle with respect to the center of the earth and the other representing the vertical velocity of the contact wheel with respect to the vehicle. Accordingly, the two voltages may be added with proper regard for polarity by conventional techniques to provide the desired signal voltage which is representative of the vertical velocity of the contact point with respect to the center of the earth. Again it may be stated that additional low pass or other type filtering can be provided at the output of the velocity sensing portion of the system to suppress ultra-short wave length disturbances or emphasize certain other wave lengths as desired.

Figure 2:
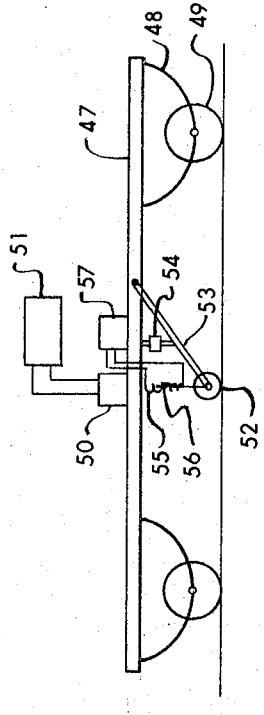
FIG. 2 is also a side elevation view of another diagrammatic example of another embodiment of the apparatus of the present invention.

Referring now to FIG. 2, one embodiment of the foregoing system may be seen. There vehicle 47 is softly suspended by suspension springs 48 mounted on wheels 49. Accelerometer 50 is mounted on vehicle 47 and connected to an appropriate processing circuit 51.

A contact member in the form of contact wheel 52 is is supported on the lower end of contact arm 53, the upper end of which is pivotally secured to vehicle 47. Arm 53 is biased downwardly by bias spring 54 such that a continuous contact point is maintained with the road surface during horizontal movement therealong.

A relative velocity sensing means is then spaced between vehicle 47 and contact wheel 52 in the form of a coil 55 having magnet 56 passing therethrough. Magnet 56 is then connected to the lower end of arm 53 and coil 55 is connected to relative velocity circuit 57. During relative vertical movement of wheel 52 with respect to vehicle 47, an electrical signal will be generated which is representative of the relative velocity of the movement between the two. During movement along the road surface, accelerometer 50 will sense the vertical movement of vehicle 47 and relative velocity circuit 57 will determine the relative velocity of contact wheel 52 with respect to vehicle 47. By adding the two signals produced thereby, with proper regard for polarity, a signal can be obtained which is representative of the vertical velocity of the contact wheel, which maintains the contact point at the surface of the road.

There are many alternate means of sensing the vertical movement of the vehicle and the relative vertical movement of the contact point with respect to the vehicle. For example, instead of a relative velocity sensor such as shown in FIG. 2, another type of accelerometer may be used, in conjunction with accelerometer 50, and connected as is shown in FIG. 5 which will be explained hereinafter.

Alternatively, instead of using a mechanical contact point, a contact point may be established by the reflection of suitable waves, such as acoustic waves, to sense the distance between the vehicle and an area on the surface over which it is traveling. Two acoustic methods, one using pulses, the other using a more or less steady tone, can be applied. The pulse method makes use of the air path from vehicle to ground and back to vehicle to produce a measurable time delay between an emitted and a reflected acoustic pulse. A signal may be derived, proportional to this time delay, as is done in acoustic well logging practice, to provide a voltage directly proportional to the distance.

The quasi steady state method employs an acoustic feed-back path from a loud speaker to a microphone via reflection at the ground surface. By connecting an amplifier between these transducers, a tone will be produced, the frequency of which is a function of the path length. By a suitably designed network, an output voltage proportional to the distance can be produced from this oscillation.

In either of the above cases, the vertical velocity between vehicle and ground surface is obtained by differentiation of the distance voltage with respect to time.

Another acoustic sensing method which makes use of the Doppler frequency shift could be used to sense vertical velocity more directly. A constant frequency tone emitted from the vehicle, reflected from the ground, and received back at the vehicle will be received at a different frequency if there is relative vertical velocity between the vehicle and the reflecting surface. The difference between the emitted and received frequencies will be representative of the relative vertical velocity. Accordingly a device which derives the difference frequency and then forms a unidirectional voltage representative thereof will provide a voltage signal representative of this relative velocity. These steps can be carried out using conventional techniques with available instrumentation.

As discussed above, the relative vertical velocity of the vehicle with respect to the surface, when algebraically combined with the vertical velocity of the vehicle itself, provides a measure of the vertical velocity of the contact point on the road surface.

Referring now to FIG. 6, one embodiment of the electrical circuitry which may be used with the apparatus shown in FIG. 2 is presented. There it will be observed that coil 55 which surrounds magnet 56, is connected by leads 60 and 61 to integrating network 62 which in turn is connected to amplifier 63, which is then connected with oscillograph 64 whose recording medium is driven by an odometer shaft in proportion to horizontal movement. Lead 60 connects with lead 65 which is connected to filter 66.

Accelerometer 50 is connected to an appropriate integrating network 67 which in turn is connected to integrating netwrok 68, which is likewise connected to amplifier 63, by appropriate leads.

In addition, the output of integrating network 67 is also applied to filter 66 by lead 69. Hence, the relative velocity sensor signal produced by coil 55 is summed with the velocity signal derived from accelerometer 50.

The output of filter 66 is applied to amplifier 71 and then to rectifier 72 and then to ratio unit 73, which corresponds with ratio device 36 shown in FIG. 4. The tachometer signal representing horizontal movement is applied to ratio unit 73, which tachometer signal corresponds with the tachometer signal generated by tachometer generator 37 shown in FIG. 4, and the operation thereof is similar.

The output of ratio unit 73 is applied to integrator 74 which is controlled to start and stop by appropriate command signals from the odometer, which for example, can be command signals covering a mile. The output of the integrator 74 is then applied to an appropriate read-out device 75, such as a recorder or the like. During operation of the circuit shown in FIG. 6 in conjunction with the apparatus of FIG. 2, contact wheel 52 is maintained in substantially continuous contact with the road surface and forms a moving contact point therewith. Simultaneously, the vertical movement of vehicle 47 is sensed and a first electrical signal is produced which is representative of the vertical movement of vehicle 47. In addition, the relative movement of the contact point (wheel 52) with respect to vehicle 47 is sensed and another electrical signal produced which is representative of the relative movement therebetween.

The circuit then sums these two signals and derives a third signal which is representative of the net vertical movement of the contact point (wheel 52) which, in this instance, is relative to the center of the earth. The resulting signal is then rectified in ratio unit 73 to produce a substantially unidirectional fourth electrical signal proportional to the third signal. The output of ratio unit 73 is then integrated in integrator 74 over a predetermined interval to obtain an indicia, which is representative of road roughness and which is recorded or read out by read-out device 75.

FIG. 5 shows another embodiment of an electrical circuit which may be employed in connection with the invention, which circuit is generally similar to that shown in FIG. 3, except that it has two vertical movement sensing devices in the form of accelerometer 78, which may be mounted on the vehicle frame and accelerometer 79 which may be mounted on the contact wheel. Accelerometer 78, being mounted on the vehicle frame, is substantially unaffected by large high-frequency accelerations since these are attenuated by the vehicle suspension system. Accordingly, accelerometer 78 may be of a type which is particularly sensitive to small accelerations at low frequencies. Conversely, accelerometer 79 must be responsive to the large high-frequency accelerations, but need not be responsive to the small low-frequency accelerations. The signals from accelerometer 79 may be suitably attenuated by a high pass filter 77 whereby the filtered signal from the accelerometer 79 now complements the signal from accelerometer 78. In this manner accelerations of both high and low frequencies are correctly sensed by one or the other of the accelerometers 78 and 79. The output of accelerometers 78 and 79 is then summed by transformer 80 and applied to integrator 81, which corresponds with integrator 18 in FIGURE 3. The balance of the circuit is similar to that shown in FIG. 3. For example, the output of integrator 81 is applied to filter 82 which is connected with amplifier 83, which is connected to low pass filter 84, to root mean square (RMS) rectifier 85, to integrating recorder 86 which is controlled by appropriate command signals from odometer 87, such that an indicia of road roughness is recorded by integrating recorder 86 at appropriate intervals.

In addition, if it is desirable to have a road profile, then integrator 88 may be connected to the output of amplifier 83 by lead 89. The output of integrator 88 is then applied to high speed oscillograph 90, which has a record medium driven in proportion to horizontal distance traveled, whereby a record is produced of the road profile.

In some instances, vertical movement of the contact point relative to an inertial reference point such as the gravitational center of the earth, may be sensed and a unidirectional electrical signal produced which is representative of average vertical movement of the contact point. Such a sensing device might be an "electronic eye" that senses the relative opaqueness of a fluid mounted on the contact member and having a material suspended therein, which material would become dispersed or suspended in the fluid to a degree proportional or representative of average vertical velocity of the contact point. The signal from the "electronic eye" could then be integrated over a predetermined interval to obtain an indicia which is representative of road roughness.

In the foregoing portion of this specification, reference has been made to integrating the roughness signal over both a time interval or a distance interval.

When integrating over a distance interval, the operation of the read out device may be clamped or held out of operation until actuation by the operator at a desired starting point. Upon reaching a predetermined starting point, the operator may actuate a switch connected to a circuit controlling the integrator, to thereby start the integrating step or to actuate the read out device to begin displaying the integral. At the same instant, the vehicle could be provided with a magnetic clutch which is adapted to simultaneously engage an odometer wheel which might make one revolution per mile, for example, which odometer wheel is connected by a appropriate speedometer cable to either the contact wheel or one of the wheels of the vehicle.

At the end of one mile, the odometer wheel could be adapted to energize circuits to perform the following operations: (a) print out the number accumulated in the read out device, (b) restore the read out device to zero, and (c) either re-engage the read out device immediately to the integrator, thus starting another cycle, or instead (as selected by a switch) disengage the clutch and await the actuation of the starting switch again by the operator when it is desirable to institute another cycle.

It is to be understood that if an integrating recorder is used instead of a numeral type read out device, the apparatus would be arranged such that at the end of a predetermined distance (such as one mile) the odometer wheel would be adapted to energize circuits which perform the following operations: (a) restore the integral recording pen to zero, and (b) either immediately thereafter resume displaying the integral, thus starting another cycle, or instead (as selected by a switch) disengage the clutch until the operator institutes another cycle. This difference in operation occurs because the integrating recorder draws a line beginning at zero and reaching some maximum value just before being restored to zero. Since this maximum value is readable on the charts, no additional steps of printing it there is required.

Further, when integrating over a predetermined time interval, the arrangement of the apparatus is similar, but the integrator is actuated or driven for a given period of time (such as one minute, for example) by a timer, instead of for a given distance (such as one mile) by an odometer.

It will thus be observed that the industry has been provided with a relatively inexpensive method and apparatus for measuring road roughness and at the same time obtaining a record of road profile that does not require the use of either an expensive gyroscope or an expensive computer. The invention also overcomes the shortcomings of the prior art discussed above.

A method and apparatus is provided which eliminates the shortcomings of the prior art and gives an accurate indicia of road roughness whereby different sections of road may be compared on an objective basis, which heretofore has not been possible with prior art methods and devices.

Further modifications may be made in the invention as particularly described without departing from the scope of the invention. Accordingly, the foregoing description is to be construed illustratively only and is not to be construed as a limitation upon the invention as defined in the following claims.

What is claimed is:

1. The method of measuring road roughness comprising the steps of:
   passing over the road surface a member having means for substantially continuously contacting the road surface and forming a moving contact point therewith;
   sensing the vertical movement of the contact point;
   producing a first electrical signal representative of the vertical velocity of the contact point;
   rectifying the first electrical signal to produce a substantially unidirectional second electrical signal proportional to first electrical signal;
   integrating the second electrical signal over a predetermined interval to obtain an indicia which is representative of road roughness.

2. The method of measuring road roughness as claimed in claim 1 including the steps of:
   integrating the first signal to produce a third electrical signal proportional to displacement of the contact point, and
   applying the third signal to a record medium driven in proportion to horizontal distance traveled to produce a record of road profile.

3. The method of measuring road roughness comprising the steps of:
   passing along a road surface a member adapted to follow the surface of the road;
   sensing the vertical movement of the member;
   producing a first electrical signal representative of the vertical velocity of the member;
   rectifying the first signal to produce a substantially unidirectional second electrical signal proportional to the first signal, and integrating the second electrical signal over a predetermined interval to obtain an indicia of road roughness.

4. The method of measuring road roughness comprising the steps of:

passing over the road surface a vehicle having means for substantially continuously contacting the road surface and forming a moving contact point therewith;

sensing the vertical movement of the vehicle and producing a first electrical signal representative of the vertical movement thereof;

sensing the relative vertical movement of the contact point with respect to the vehicle and producing a second electrical signal representative of the relative movement thereof;

summing the first and second signals and deriving a third electrical signal representative of the vertical movement of the contact point;

rectifying the third signal to produce a substantially unidirectional fourth electrical signal proportional to the third signal, and integrating the fourth signal over a predetermined interval to obtain an indicia which is representative of road roughness.

5. The method as claimed in claim 4 including the steps of:

deriving a fifth electrical signal from the first signal which is proportional to displacement of the contact point, and applying the fifth signal to a record medium to produce a record of road profile.

6. The method of measuring road rougness comprising the steps of:

passing over the road surface a vehicle having means for substantially continuously contacting the road surface and forming a moving contact point therewith;

sensing the vertical movement of the vehicle and producing a first electrical signal representative of the velocity thereof;

sensing the relative vertical movement of the contact point with respect to the vehicle and producing a second electrical signal representative of the relative velocity thereof;

summing the first and second signals and deriving a third electrical signal representative of the vertical velocity of the contact point;

rectifying the third signal to produce a substantially unidirectional fourth electrical signal proportional to the third signal, and integrating the fourth signal over a predetermined interval to obtain an indicia which is representative of road roughness.

7. The method as claimed in claim 6 including the steps of:

integrating the third electrical signal to produce a fifth electrical signal, and applying the fifth electrical signal to a record medium driven in proportion to horizontal distance traveled to produce a record of road profile.

8. An apparatus for measuring the roughness of a road surface, comprising:

a member adapted for passing along the road and having means for substantially continuously contacting the road surface at a movable contact point during horizontal movement therealong;

means for sensing the vertical movement of the contact point during horizontal movement along the road and producing a first electrical signal representative of the vertical velocity thereof;

means for rectifying the first electrical signal to produce a substantially unidirectional second electrical signal proportional to the first electrical signal, and means for integrating the second signal over a predetermined interval as an indication of road roughness.

9. The apparatus as claimed in claim 8 including:

means for integrating the first signal to produce a third electrical signal proportional to displacement of the contact point, and recording means having a recording medium driven proportional to the horizontal distance traveled for recording the third signal to produce a record of road profile.

10. An apparatus for measuring the roughness of a road surface, comprising:

a member adapted to be passed along and follow the surface of a road;

means for sensing the vertical movement of the member during horizontal movement along the road and producing a first electrical signal representative of the vertical velocity of the member;

means for rectifying the first signal to produce a substantially unidirectional second electrical signal proportional to the first signal, and means for receiving and integrating the second electrical signal over a predetermined interval to obtain an indicia of road roughness.

11. An apparatus for measuring the roughness of a road surface, comprising:

a vehicle adapted for passing along the road and having a contact member biased into substantially continuous contact with the road surface;

means for sensing the vertical movement of the vehicle while traversing the road and producing a first electrical signal representative of the vertical movement thereof;

means for sensing the relative vertical movement of the contact member with respect to the vehicle and producing a second electrical signal representative of the relative movement thereof;

means for receiving the first and second signals and producing a third electrical signal proportional to the sum of the first and second signals;

means for rectifying the third signal to produce a substantially unidirectional fourth electrical signal proportional to the third signal, and means for receiving and integrating the fourth signal over a predetermined interval as an indicia of road roughness.

12. The apparatus as claimed in claim 11 including:

means for receiving the first signal and deriving a fifth electrical signal which is proportional to displacement of the contact member, and recording means for recording the fifth signal as a record of road profile.

13. An apparatus for measuring the roughness of a road surface, comprising:

a vehicle adapted for passing along the road and having a contact member biased into substantially continuous contact with the road surface;

means for sensing the vertical movement of the vehicle while traversing the road and producing a first electrical signal representative of the vertical velocity thereof.

means for sensing the relative vertical movement of the contact member with respect to the vehicle and producing a second electrical signal representative of the relative velocity thereof;

means for receiving the first and second signals and producing a third electrical signal representative of the sum of the first and second signals;

means for rectifying the third signal to produce a substantially unidirectional fourth electrical signal proportional to the third signal, and means for receiving and integrating the fourth signal over a predetermined interval as an indicia of road roughness.

14. The apparatus as claimed in claim 13 including:
means for integrating the third signal to produce a fifth electrical signal proportional to displacement of the contact member, and
recording means having a recording medium driven proportional to horizontal distance traveled for recording the fifth signal to produce a record of road profile.

15. The method of measuring road roughness comprising the steps of: passing over the road surface a member having means for substantially continuously contacting the road surface and forming a moving contact point therewith; sensing the vertical movement of the contact point; producing a first electrical signal representative of the vertical movement of the contact point; rectifying the first electrical signal to produce a substantially unidirectional second electrical signal proportional to first electrical signal; integrating the second electrical signal over a predetermined interval to obtain an indicia which is representative of road roughness; deriving a third electrical signal from the first signal which is proportional to displacement of the contact point; and, applying the third signal to a record medium to produce a record of road profile.

16. An apparatus for measuring the roughness of a road surface, comprising: a member adapted for passing along the road and having means for substantially continuously contacting the road surface at a movable contact point during horizontal movement therealong; means for sensing the vertical movement of the contact point during horizontal movement along the road and producing a first electrical signal representative of the vertical movement thereof; means for rectifying the first electrical signal to produce a substantially unidirectional second electrical signal proportional to the first electrical signal; means for integrating the second signal over a predetermined interval as an indication of road roughness; means for receiving the first signal and deriving a third electrical signal which is proportional to displacement of the contact point; and, recording means for recording the third signal as a record of road profile.

References Cited
UNITED STATES PATENTS

| | | | |
|---|---|---|---|
| 2,344,217 | 3/1944 | Reason et al. | 73—105 |
| 2,405,133 | 8/1946 | Brown | 73—105 |
| 3,112,642 | 12/1963 | Harmon et al. | 73—105 |
| 3,151,235 | 9/1964 | Greenshields | 73—105 X |
| 3,266,302 | 8/1966 | Spangler et al. | 73—146 X |

LOUIS R. PRINCE, *Primary Examiner.*

D. O. WOODIEL, *Assistant Examiner.*